(12) United States Patent
Breeuwer et al.

(10) Patent No.: US 8,537,159 B2
(45) Date of Patent: Sep. 17, 2013

(54) VISUALIZATION OF VOXEL DATA

(75) Inventors: Marcel Breeuwer, Eindhoven (NL); Javier Olivan Bescos, Eindhoven (NL); Maurice Alain Termeer, Vienna (AT)

(73) Assignee: Koninklijke Philips N.V., Eindhoven (NL)

( * ) Notice: Subject to any disclaimer, the term of this patent is extended or adjusted under 35 U.S.C. 154(b) by 762 days.

(21) Appl. No.: 12/675,982

(22) PCT Filed: Aug. 28, 2008

(86) PCT No.: PCT/IB2008/053464
§ 371 (c)(1),
(2), (4) Date: Mar. 2, 2010

(87) PCT Pub. No.: WO2009/031081
PCT Pub. Date: Mar. 12, 2009

(65) Prior Publication Data
US 2010/0201687 A1    Aug. 12, 2010

(30) Foreign Application Priority Data

Sep. 3, 2007  (EP) ..................................... 07115571

(51) Int. Cl.
*G06T 17/00*    (2006.01)
(52) U.S. Cl.
USPC ........................................................ 345/424
(58) Field of Classification Search
USPC ........................................................ 345/424
See application file for complete search history.

(56) References Cited

U.S. PATENT DOCUMENTS

| 5,151,856 | A | 9/1992 | Halmann et al. |
| 5,435,310 | A * | 7/1995 | Sheehan et al. ............... 600/416 |
| 7,587,232 | B2 * | 9/2009 | Sugiura ......................... 600/410 |
| 2005/0163357 | A1 | 7/2005 | Makram-Ebeid et al. |
| 2006/0045328 | A1 * | 3/2006 | Jacob et al. ................... 382/154 |
| 2007/0014452 | A1 | 1/2007 | Suresh et al. |

FOREIGN PATENT DOCUMENTS

EP    1182619 A2    2/2002

OTHER PUBLICATIONS

Kuehnel et al: "New Software Assistants for Cardiovascular Diagnosis"; Compterunterstutzung Fur Die Medizinische Diagnose Und Therapieplannung:; Within GI Annual Conference, Dresden, Germany, Oct. 2-6, 2006, vol. 1, pp. 491-498.

(Continued)

*Primary Examiner* — Edward Martello (57) ABSTRACT

The invention relates to visualization of medical images, and in embodiments to the visualization of the left ventricle of the human heart or other organs. A method of visualizing one or more sets of voxel data is disclosed. The method comprising: providing one or more sets of voxel data, providing and segmenting the voxel data in accordance with a segment model. The segmented voxel data is reformatted to fit a reference shape (20) being defined by at least an inner (22) reference surface and an outer (23) reference surface. The reformatted voxel data is mapped to a target shape being defined by at least a first (29) target surface and a second (200) target surface. The target shape is moreover visualized. The mapping of the reformatted voxel data to a target shape is a mapping of one or more property values from the inner reference surface to the first target surface, and from the outer reference surface to the second target surface, and where a direction (26, 27) extending along the inter-surface distance of the reference shape is maintained in the target shape.

18 Claims, 7 Drawing Sheets

(56) References Cited

OTHER PUBLICATIONS

Cerqueira et al: "Standardized Myocardial Segmentation and Nomenclature for Tomographic Imaging of the Heart—A Statement of Healthcare Professionals From the Cardiac Imaging Committee of the Council on Clinical Cardiology of the American Heart Association", Circulation, American Heart Association, vol. 105, No. 4, Jan. 29, 2002, pp. 539-542.

Termeer et al: "CoViCAD: Comprehensive Visualization of Coronary Artery Disease"; IEEE Transactions on Visualization and Computer Graphics, vol. 13, No. 6, Nov./Dec. 2007, pp. 1632-1639.

Plets et al: "Magnetic Resonance Cardiac Tagging: Visualization of LV Function Parameters"; Computers in Cardiology, 1996, pp. 273-276.

Oeltze et al:"Integrated Visualization of Morphologic and Perfusion Data for the Analysis of Coronary Artery Disease"; Eurographics/IEEE-VGTC Symposium on Visualization (2006) pp. 131-138.

Noble et al:"The Automatic Identification of Hibernating Myocardium"; Medical Image Computing and Computer-Assisted Intervention-MICCAI 2004, LNCS 3217, pp. 890-898.

Vandermeulen et al:"Integrated Visualization of Brain Anatomy and Cerebral Blood Vessels"; 1992 Workshop on Visualization, pp. 39-46.

\* cited by examiner

VISUALIZATION OF VOXEL DATA

FIELD OF THE INVENTION

The invention relates to visualization of medical images, and in particular to the area of visualization of anatomy and associated quantitative analysis data derived from the medical images.

BACKGROUND OF THE INVENTION

Medical imaging systems such as magnetic resonance imaging (MRI) are capable of producing exact cross-sectional image data that express the physical properties related to the human or animal body. Reconstruction of three-dimensional (3D) images using collections of parallel 2D images representing cross-sectional data has been applied in the medical field for some time.

Various rendering techniques are applied for 3D display of medical images. One such technique is surface rendering. A limitation of this technique is that it does not adequately visualize the tissue within solid organs; it is optimized for visualization of surfaces and boundaries.

Another rendering technique is volume-rendering. Instead of overlaying surfaces using a complex model of 3D data, volume-rendering relies on the assumption that 3D objects are composed of basic volumetric building blocks, so-called "voxels". A voxel has a spatial coordinate and associated voxel values like signal intensity, transparency, assigned color, and so forth. By using a set of voxel data it is possible by volume rendering to provide an image of the body part of the patient under examination by various volume rendering techniques. In general, a "voxel" is a unit cube with a unit vector along the x-axis, a unit vector along the y-axis, and a unit vector along the z-axis of a three-dimensional image.

In connection with examination and quantitative analysis of the left ventricle of the heart, the so-called bull's-eye plot is a wide-spread and accepted analysis tool. In the article: "Integrated Visualization of Morphologic and Perfusion Data for the Analysis of Coronary Artery Disease" by S. Oeltze et al. published in *Proc. EuroVis*, pages 131-138, 2006, a visualization tool for the left ventricle of the heart is disclosed. In the disclosure the bull's-eye plot is extended to include a 3D-elevation profile of a parameter map overlayed onto to a bull's eye plot. However, even though quantitative analysis is related to the anatomy via the bull's-eye plot, the bull's-eye plot is an abstraction that does not directly reflect the anatomy of the left ventricle.

In general, despite of the availability of detailed 3D images of the body part under investigation it is still challenging for the clinical user to efficiently extract information from the data. The clinical user typically needs to inspect a plurality of cross-sections and 2D visualizations of the anatomy and the quantitative analysis data and combine these mentally. This leads to inefficient analysis and decreases the reproducibility of the diagnostic work flow. As the data size increases, there is an ever increasing need in the art for condensed and comprehensive visualization.

Hence, an improved method for visualizing a 3D image of a human or animal body part would be advantageous, and in particular a more efficient method that would improve the coupling between quantitative analysis data and anatomy.

SUMMARY OF THE INVENTION

The invention preferably seeks to mitigate, alleviate or eliminate one or more of the above mentioned disadvantages singly or in any combination. In particular, it may be seen as an object of the present invention to provide a method that solves the above mentioned problems, or other problems, of the prior art related to visualization of the human body or parts of the human body.

This object is achieved in a first aspect of the invention by providing a method of visualizing one or more sets of voxel data, the sets of voxel data representing a three dimensional (3D) image of at least a part of a mammal body, the method comprising:

providing one or more sets of voxel data comprising spatial information for each voxel point, and, for each voxel point, a corresponding set of voxel values;

providing a segment model of the part of the mammal body, and segmenting the voxel data in accordance with this segment model;

reformatting the segmented voxel data to fit a reference shape, the reference shape being defined by at least an inner reference surface and an outer reference surface;

mapping the reformatted voxel data to a target shape, the target shape being defined by at least a first target surface and a second target surface;

visualizing the target shape;

wherein the mapping of the reformatted voxel data to a target shape is a mapping of one or more property values from the inner reference surface to the first target surface, and from the outer reference surface to the second target surface, the one or more property values being based on at least one voxel value from the one or more sets of voxel values, and wherein a direction extending along the inter-surface distance of the reference shape is maintained in the target shape.

The present invention relates to the area of visualization of anatomy and associated quantitative analysis data derived from medical images. The medical images may be obtained in connection with a medical imaging technique, including but not limited to magnetic resonance imaging (MRI), computed tomography (CT), positron electron tomography (PET), single photon emission computed tomography (SPECT), ultrasound scanning, and rotational angiography. Based on the obtained images, one or more sets of voxel data are derived.

The mapping is performed in order to transform quantitative analysis data in the form of one or more property values to a representation which summarizes the volumetric distribution of the property value, in the region enveloped by the outer and the inner reference surfaces. Only a single property value may be visualized, since this may provide the clearest representation. Nevertheless, two or more property values may be visualized in a combined visualization. Examples of possible ways of visualizing multiple values at the same time include, but are not limited to: merging colors, merging colors with brush strokes, merging colors with textures.

The one or more property values may represent one or more values related to one or more medical parameters. The outer and the inner reference surface may in embodiments define a region of interest for an organ under examination.

The invention is particularly, but not exclusively, advantageous for providing a target shape which support visualization of continuous quantitative data, and as a consequence does not suffer from the quantization of data into sectors as the bull's-eye plot does. Even though, if required by the user, it is possible to provide the same quantification as in classic bull's eye plots. The inner and outer reference surfaces are correlated to the anatomy of the part of the mammal body since they envelop the body part under examination. As a consequence, the direction extending along the inter-surface distance is maintained in the target shape, the volumetric nature of the region between the inner and outer reference surfaces is preserved, and a direct coupling to the anatomy is obtained in the target shape.

An effect of maintaining the direction extending along the inter-surface distance is that in connection with visualization of walled body parts, such as the left ventricle of the heart or other hollow organs or body parts, the transmurality is preserved. Transmurality information is lost in the bull's-eye plot. It is an advantage of the present invention that transmurality information is directly available for the property value, and moreover is available together with the continuous volumetric distribution of the property value. A more efficient quantitative analysis is thereby available to the clinician, facilitating a more efficient diagnosis process for the clinician.

In an advantageous embodiment, the mapping between the reference shape and the target shape is such that distinct values in the reference shape are mapped to distinct values in the target shape. In general the mapping may be injective or non-injective mapping. Non-injective mapping may be applied in the situation where the inner reference surface is in the form of a point. Typically, however, injective mapping is applied.

Typically, the mapping is from the outer surface to the inner surface, but in general, the mapping can be from the inner surface to the outer surface as well.

In an advantageous embodiment, one or more reference structures are identified in the one or more sets of voxel data and mapped onto the target shape, enabling a visualization of the target shape with the one or more reference structures overlayed or superimposed. While the target shape is correlated to the anatomy by its continuous volumetric nature and conservation of the inter-surface distance, it is still an abstraction of the anatomy. By mapping reference structures onto the target shape, an improved correlation to the anatomy may be provided, and moreover, structures which are related to a property value under investigation can directly be corrected to the distribution geometry of the property value. The presence of localized reference structures renders the target shape patient specific, which may be important in connection with the diagnosis.

In advantageous embodiments, a 3D spatial rendering of the set of voxel data is provided and visualized in combination with a visualization of the target shape. Optionally, a region may be selectable on the 3D spatial rendering or on a rendering of the target shape, and wherein by selecting a region on one of the 3D spatial rendering or on a rendering of the target shape, the corresponding region is marked on the other of the 3D spatial rendering or on rendering of the target shape. It is advantageous to provide a combined interactive visualization of the anatomy and the quantitative analysis data of the target shape. A comprehensive visualization may thereby be provided. By providing a combined visualization of the target shape and a 3D spatial rendering of the set of voxel data, and by interactive linking the two objects, it is made possible for the clinician to navigate through both anatomical aspects and schematic analysis aspects in a comprehensive way.

In connection with the visualization of the target shape alone or the combined visualization of the target shape and the 3D spatial rendering, various cut planes at various locations and orientations may be made. The user thereby has the flexibility to inspect the anatomy and the one or more property values from any viewpoint and to make a comparison with the existing visualization techniques.

The reference shape may represent a reformatted geometry of the part of the mammal body. Many body parts possess a complex, individual and possibly time-varying shape. By reformatting the geometry to a reference shape, it is rendered much easier to compare body parts under investigations for a given individual to other individual or standard models.

The direction extending along the inter-surface distance of the target shape may represent the thickness of the region of interest for the organ. The thickness may be scaled to the distance between the outer reference surface and the inner reference or to an anatomical thickness of the region of interest for the organ. By scaling the thickness to the reference shape, comparison to other organs or models is possible, whereas by scaling the thickness to the anatomical thickness of the region of interest, the target shape is rendered patient specific. It may be advantageous to be able to shift between schematic and specific representation.

In an advantageous embodiment, the mapping is based on transformation maps. The use of transformation maps is computationally fast.

In accordance with a second aspect of the present invention there is provided a visualization system for visualizing one or more sets of voxel data, the set of voxel data representing a three dimensional (3D) image of at least a part of a mammal body, the system comprising:
  input unit for receiving one or more sets of voxel data comprising spatial information for each voxel point, and, for each voxel point, a corresponding set of voxel values;
  segmenting unit for providing a segment model of the part of the mammal body, and segmenting the voxel data in accordance with this segment model;
  reformatting unit for reformatting the segmented voxel data to fit a reference shape, the reference shape being defined by at least an inner reference surface and an outer reference surface;
  mapping unit for mapping the reformatted voxel data to a target shape, the target shape being defined by at least a first target surface and a second target surface;
  visualizing unit for visualizing the target shape;
  wherein the mapping of the reformatted voxel data to a target shape is a mapping of one or more property values from the inner reference surface to the first target surface, and from the outer reference surface to the second target surface, the one or more property values being based on at least one voxel value from the one or more sets of voxel values, and wherein a direction extending along the inter-surface distance of the reference shape is maintained in the target shape.

The visualization system may be implemented as a specially programmed general-purpose computer.

In accordance with a third aspect of the invention, there is provided a medical examination apparatus further comprising an acquisition unit for acquiring medical image data in the form of one or more sets of voxel data. The acquisition unit may be a medical scanner.

In accordance with a fourth aspect of the invention, there is provided a computer program product having a set of instructions, when in use on a computer, to cause the computer to perform the steps of the first aspect of the invention.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Embodiments of the present invention are discussed and illustrated in connection with the left ventricle of the human heart. It is however to be understood, that even though the present invention may advantageously be applied specifically for the various heart structures (ventricles, atria, valves, etc.), embodiments of the present invention may be more generally applied to other parts of a mammal body, as is clear to the skilled person. In this respect, the term a "part of a mammal body" is an anatomical region of interest. In particular anatomical regions of interest, include but are not limited to organs, including hollow organs having a wall, and where wall properties is to be investigated in connection with a medical examination of the organ.

Figure 1:
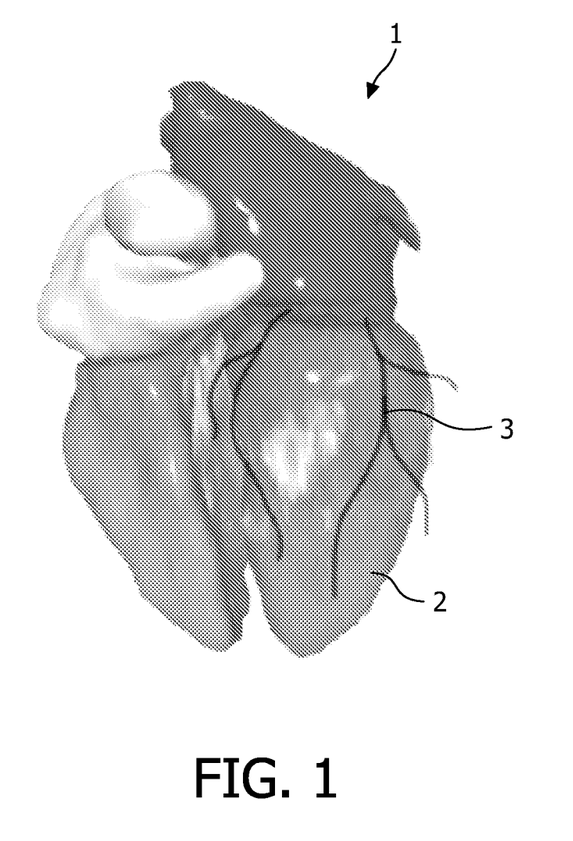
FIG. 1 illustrates a 3D surface rendering of the four chambers of a human heart 1.

FIG. 1 illustrates a 3D surface rendering of the four chambers of a human heart 1, including the left ventricle 2 and part of the coronary artery tree 3. The muscle tissue that forms the wall of both ventricles is called the myocardium. The part of the myocardium that separates the left and right ventricles is called the septum. As any muscle tissue, the myocardium requires oxygen to operate. This is supplied by the coronary arteries, numerous vessels surrounding the heart.

Over time a stenosis, i.e. a partial or complete occlusion of a vessel may develop in one or more of the coronary arteries. A patient with stenosis is said to have coronary artery disease (CAD), a patient with stenosis is in risk of a myocardial infarction, also known as a heart attack. In connection with a stenosis, a part of the heart tissue experiences a shortage of oxygen which causes damage to the tissue. The detection and quantification of infarcted myocardial tissue, also called scar, is of importance for the assessment of the infarct location and severity. The severity of scar is partially determined by the transmurality; how far the scar extends into the left ventricular wall.

To optimally diagnose heart disease, to select or plan a given therapy, to monitor the progression of the disease and the effect of the therapy, 3D visualization is needed that shows the heart's anatomy in combination with one or more available quantitative analysis data. Examples of analysis data include but are not limited to data relating to function, perfusion, viability and flow.

MRI has been shown to be an effective diagnosis technique for CAD. Among the wide variety of MRI acquisition protocols is the Late-Enhancement (LE) imaging, a protocol that uses a contrast agent to visualize scar. In the LE images, scar tissue shows up brighter on the images than healthy tissue does. Embodiments of the present invention are explained in connection with LE images.

It is known in the art to represent the left ventricle in accordance with a segment model and a reference shape, for example in connection with the bull's-eye plot.

Figure 2:
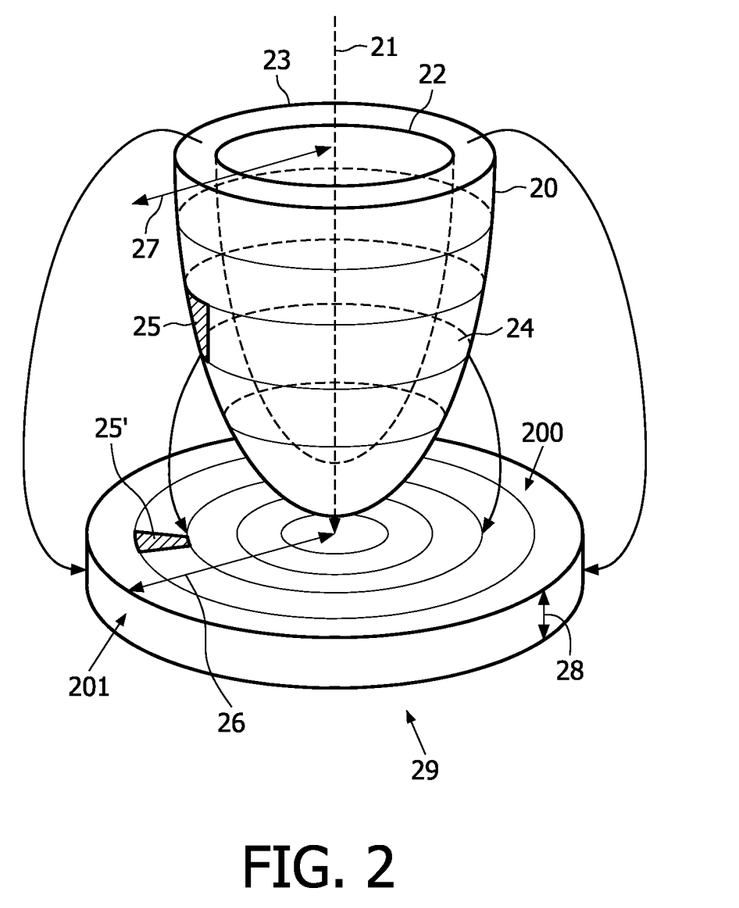
FIG. 2 schematically illustrates aspects of constructing a target shape, in the form of a so-called volumetric bull's eye plot (VBEP)

FIG. 2 schematically illustrates aspects of constructing a target shape (201) in the form of a so-called volumetric bull's eye plot (VBEP), a plot that is obtained in connection with embodiments of the present invention. In FIG. 2, the target shape (201) has a circular cross-section along the symmetry axis, in general other cross-section may be applied, such as elliptic or polygonal cross-section along a symmetry direction. Moreover, the cross-sections need not to be of the same size, for example, the target shape may be in the form of a sphere, an ellipsoid, a polyhedron, etc.

In an embodiment, the one or more sets of voxel values include so-called whole heart (WH) MRI data. WH MRI data include image data from which an anatomical image rendering can be made. Moreover, the voxel values include LE image data. That is image data including data from which the geometrical location of the contrast agent can be deduced. Thus, in the present embodiment, the set of voxel data, include geometrical coordinates for at least a parameter or property value indicative of the anatomy, e.g. the nuclear density obtained by the MR scan of the heart before injection of the contrast agent, and the nuclear density obtained by the MR scan of the heart including the contrast agent of the LE scans. In general, the property value represents a value related to a medical parameter, here the presence of scar in the ventricular wall. Examples are provided illustrating a single property value, it is however to be understood that two or more property values may be visualized. For example, scar tissue and wall motion. Scar tissue indicates which part of the heart is dead, whereas wall motion indicates which part of the heart moves. Assuming scar values in the range [0,1] and wall motion values in the range [0,1]. The two properties can be visualized at the same time. A point with a pair (scar, wall motion) of (1,0) indicates totally dead myocardium, without possibilities to recover. A point with a pair (0.8, 0.4) indicates that the myocardium is not totally dead, and that it may recover in the future.

In connection with determining the property value in the present example, scar should be discriminated from healthy tissue in the voxel values. This may be obtained by use of a function that classifies density values as either scar or viable tissue. The function may automatically determine scar tissue or semi-automatically determine scar tissue. In a semi-automatically determination, the classification function receives input from the user as how to define scar (for example, by locating scar tissue and viable tissue in the voxel data). In general, the property value may be constructed in any relevant way, however, in many situations, the property value is constructed based on images showing contrast, either originating from the imaging itself, or from an appropriate contrast agent, in combination with a discrimination or classification function.

The voxel data is segmented in accordance with a segment model. The segmentation may be performed automatically, semi-automatically or even manually. The segmentation may manually be done by identifying the voxels of interest. For example, to identify the voxels that constitutes the myocardium of the left ventricle.

The segmented voxel data is fitted to a reference shape. In connection with the left ventricle, a truncated ellipsoid may be applied. FIG. 2 illustrates an example of a reference shape in the form of a truncated ellipsoid 20. In the reformation of the segmented voxel data, the true anatomical location of the myocardium data is fitted to match the reference shape. The segmentation results in the positioning the inner and outer reference surfaces.

The reference shape includes the long axis 21 of the left ventricle, the inner wall or endocardium 22 and the outer wall or epicardium 23. Each cross-section, as defined by a contour 24 of the reference shape, represents a reformatted or fitted MRI slice onto the reference shape. The segmentation and reformatting of the voxel data onto a reference shape is known in the art.

In accordance with embodiments of the present invention, the reformatted voxel data is mapped to a target shape by a mapping of the property value from the inner reference surface to the first target surface, and from the outer reference surface to the second target surface. Here the classified LE data, i.e. a property value indicative of intensity of the contrast agent, is mapped from the set of voxel values to a target shape in the form of a cylinder. In connection with FIG. 2, each contour 24 of the reference shape constitutes a section of the reference shape, and the contours 24 are projected to a single concentric ring of a 2D plane 26, in the form of a 2D plane of a cross-section of the target shape. In FIG. 2, the mapping is illustrated by a mapping of the section 25 on the reference shape to the section 25' on the 2D plane of the target shape. The mapping is continuous, so no quantification of the data in the section 25 on the reference shape is made in connection with the mapping to the section 25' on the target shape. The sections are shown purely for illustrative reasons, not in order to indicate a quantification of the data.

The direction extending along the inter-surface distance of the reference shape is maintained in the target shape, so that wall thickness along the direction indicated by reference numeral 27 of the reference shape is mapped into the direction of the depth dimension of the cylinder, as indicated by reference numeral 28.

As a result, the left ventricle is mapped onto a target shape in the form of a cylinder, where each plane represents a projection of the myocardial tissue in the given thickness of the wall, and where the dimension along the cylinder axis represents the thickness of the myocardial wall. The endocardium 22 is thus projected onto the bottom of the cylinder, i.e. the first surface 29, whereas the epicardium 23 is projected onto the top of the cylinder, i.e. the second surface 200. The tissue in between the endocardium and the epicardium is projected onto the planes extending from the bottom to the top of the cylinder.

Figure 3:
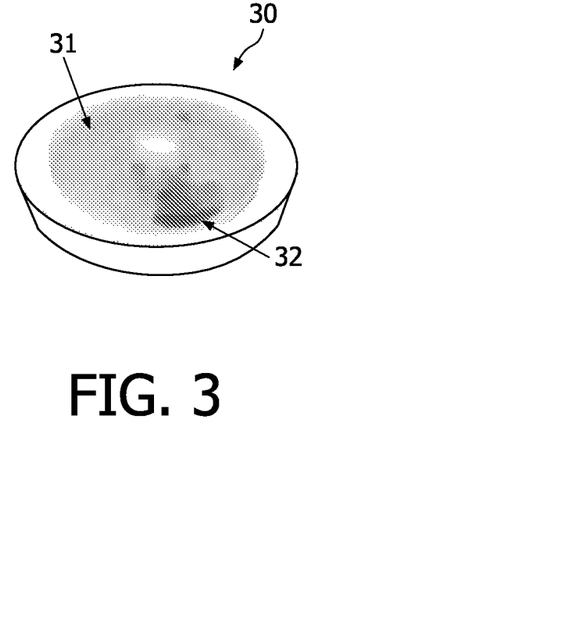
FIG. 3 shows an example of a visualized target shape.

Finally, the target shape of the property value is visualized, typically on a computer screen of a user. FIG. 3 shows an example of a visualized target shape 30, where visualization of the target shape is obtained by a volume rendering of the target shape. The target shape is hereafter also referred to as the volumetric bull's eye plot (VBEP). In the visualization of the target shape 30, areas which do not show any or little sign of scar tissue is shown in light grey 31, whereas regions showing scar tissue is shown in dark grey 32. Further examples of VBEP's are provided below.

Figure 4:
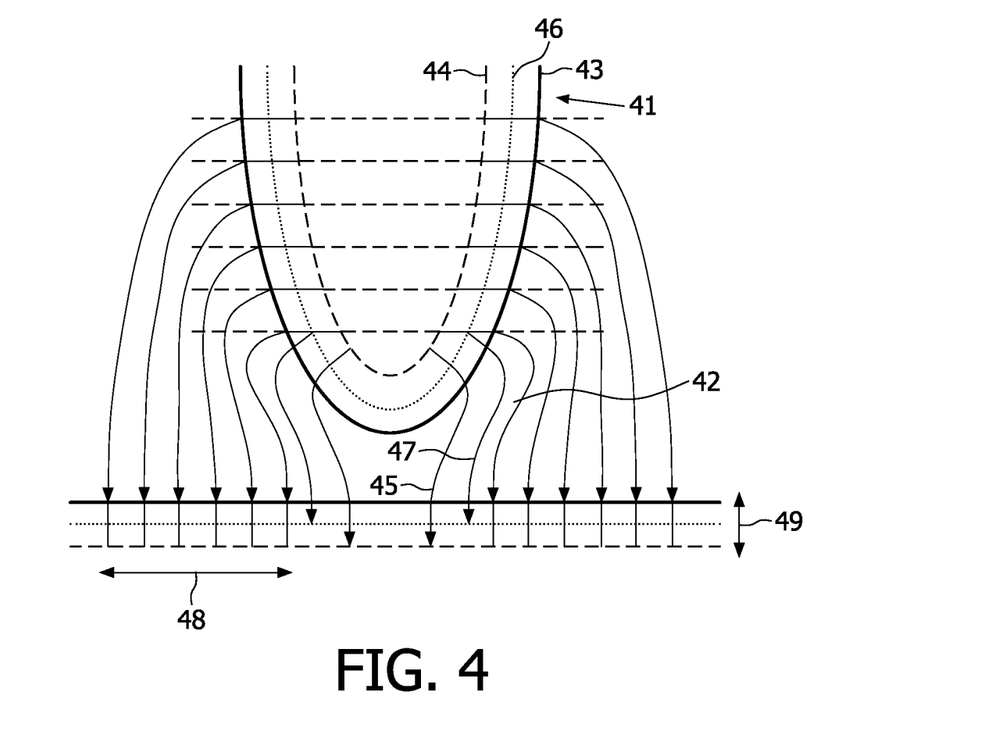
FIG. 4 illustrates in cross-sectional view aspects of constructing a target shape.

FIG. 4 illustrates in cross-sectional view, aspects of the geometrical mapping of the myocardium to the VBEP, as discussed in connection with FIG. 2. The Figure shows a cut through the reference shape 41. As explained in FIG. 2, sections on the outer surface 43 of the reference shape are mapped 42 onto sections on the top (second) surface of the target shape, and sections on the inner surface 44 of the reference shape are mapped 45 onto sections on the bottom (first) surface of the 3D plot, and sections on intermediary surfaces 46 of the reference shape are mapped 47 onto sections on the top surface of the 3D plot. Continuous volume data are thereby obtained along the horizontal direction 48, and the wall thickness is represented in the vertical direction 49. Here, the wall thickness is illustrated to be constant. It is, however, also possible to use a varying wall thickness, so that the wall thickness reflects the reel wall thickness of the left ventricle.

Figure 5:
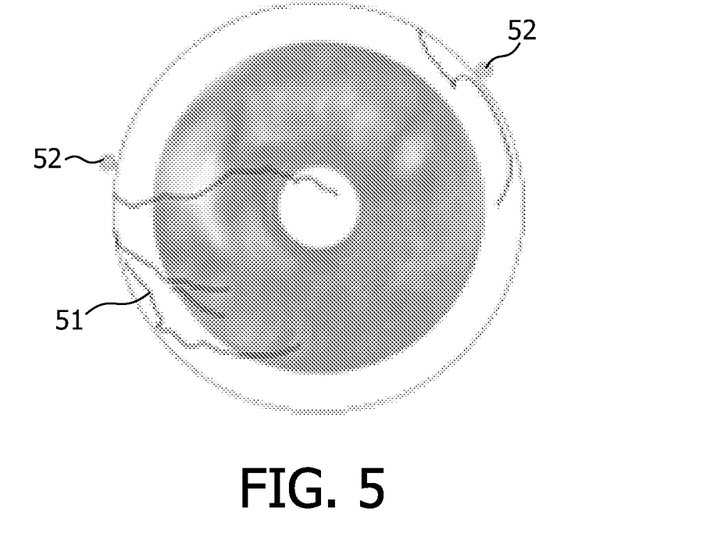
FIG. 5 illustrates a top view of a VBEP with reference structures overlayed thereon.

FIG. 5 illustrates a top view of a VBEP with reference structures overlayed thereon. By identifying one or more reference structures in the set of voxel data, these reference structures may be mapped onto the VBEP. In FIG. 5, the coronary arteries 51 are overlayed. Moreover, two dots 52 are overlayed in order to show the locations where the right ventricle joins the left ventricle. By overlaying the coronary arteries a clear correlation between arteries and scar tissues can be made. By overlaying joint points, a better perception of the orientation of the ventricle is provided. In the FIGS. 5 to 7, as contrary to FIG. 3, areas which do not show any or little sign of scar tissue are shown darker than areas showing scar tissue, which are shown in lighter grey or white.

Figure 6:
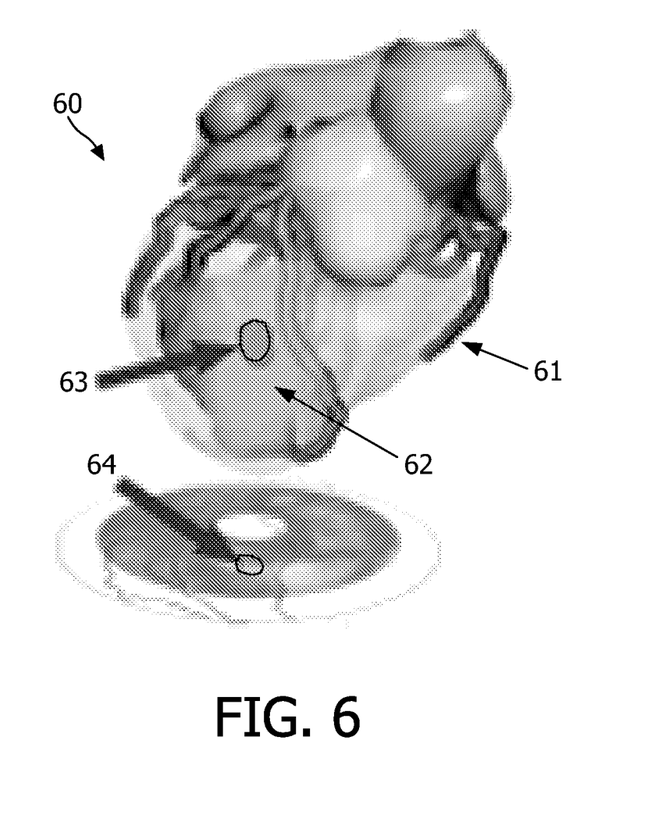
FIG. 6 shows a combined correlated visualization of the VBEP and a 3D spatial rendering of the set of voxel data.

FIG. 6 illustrates further aspects of embodiments of the present invention. FIG. 6 shows a combined correlated visualization of the VBEP and a 3D spatial rendering 60 of the set of voxel data. In general, it is problematic to visualize internal structures in 3D, since objects closer to the viewer shadow objects further away from the viewer. In FIG. 6, the left ventricle 61, i.e. the voxels contained in the segment model are rendered semi-transparent, so that areas 62 exhibiting the presence of contrast agent can be seen. Moreover, to facilitate a visualization of the 3D anatomical location of the scar tissue, a region 63, 64 may be selected on the 3D spatial rendering or on the VBEP or on the rendering of the target shape, and wherein by selecting a region on one of the 3D spatial rendering or on the rendering of the target shape, the corresponding region is marked on the other of the 3D spatial rendering or on the rendering of the target shape. A clear and direct correlation between the property value and the geometry is thereby provided.

FIG. 7 illustrates an important advantage of the VBEP, namely that it directly visualizes the transmurality of scar, i.e. the extent of scar tissue into the left ventricular wall. This information is contained in the depth dimension of the VBEP along the cylinder axis.

Figures 7A, 7B:
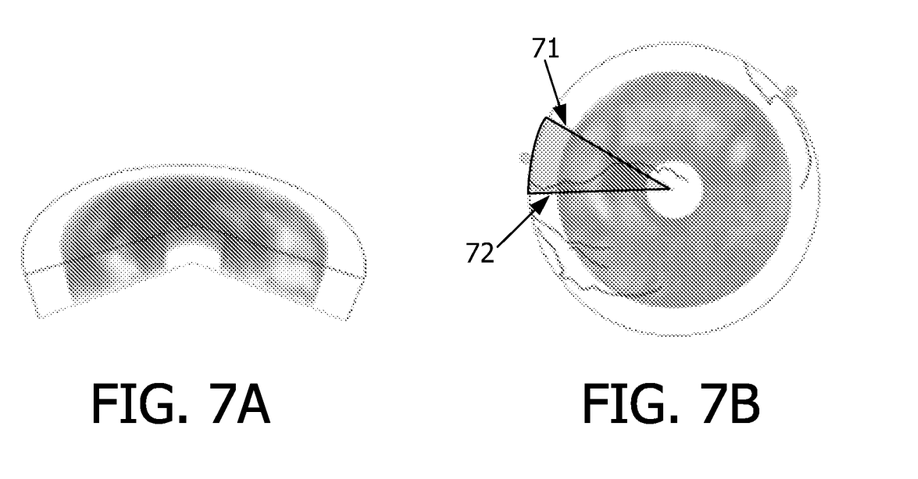
FIG. 7 shows a visualization of the transmurality of scar.
Figure 7C:
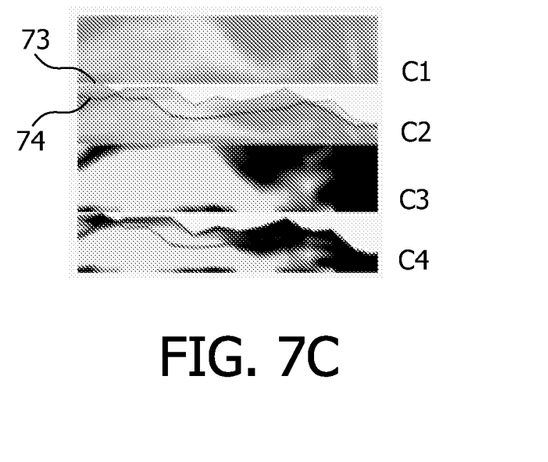

FIG. 7A show a VBEP from the side with a wedge-shaped cut-out. Along the edge of the cut-out, the transmurality can be observed. In order to inspect a larger region of interest for transmurality, a slice can be selected, and the region can be rendered for combined view. This is illustrated in FIG. 7C, where the region of FIG. 7B is shown in 2D view. The images denoted C1 and C3 show direct volume rendering (DVR) and maximum intensity projection (MIP) images, respectively, as seen from the side denoted by 71 on FIG. 7B, whereas the images denoted C2 and C4 show DVR and MIP images, respectively, as seen from the side denoted by 72 on FIG. 7B. The maximum thickness 73 and the minimum thickness 74 are shown on the images denoted C2 and C4.

Figure 8:
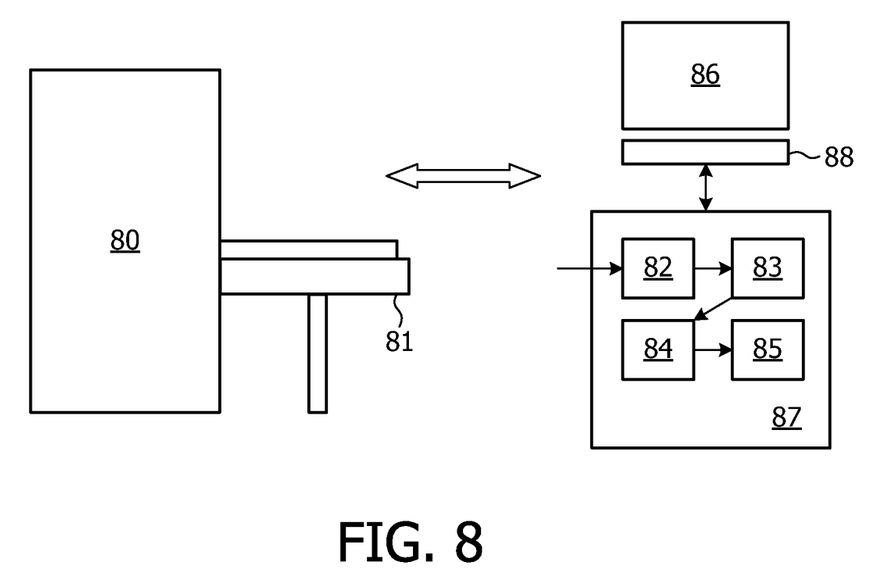
FIG. 8 schematically illustrates components of a visualization system, incorporated in a medical examination apparatus.

FIG. 8 schematically illustrates components of a visualization system in accordance with the present invention, incorporated in a medical examination apparatus. As indicated schematically in FIG. 8, the medical examination apparatus typically includes a bed 81 on which the patient lie or another element for localizing the patient relative to the acquisition unit 80. The acquisition unit may be a medical imaging apparatus, such as a MR scanner, or other medical scanner. The acquisition unit acquires medical image data in the form of one or more sets of voxel data. The image data, in the form of voxel data, produced by the scanner is fed into a visualization system.

The voxel data is received in an input unit 82. In a segmenting unit 83, a segment model is provided in order to segmenting the voxel data in accordance with this segment model. The segmenting may be performed in connection with receiving user input, from a user interaction unit 88. A reformatting unit 84 reformatting the segmented voxel data to fit a reference shape, and a mapping unit 85 maps the reformatted voxel data to a target shape. The target shape being visualized by a visualizing unit 86, typically in the form of a computer screen. The elements of the visualization system may be implemented by one or more data processors 87 of a general-purpose or dedicated computer.

Figure 9:
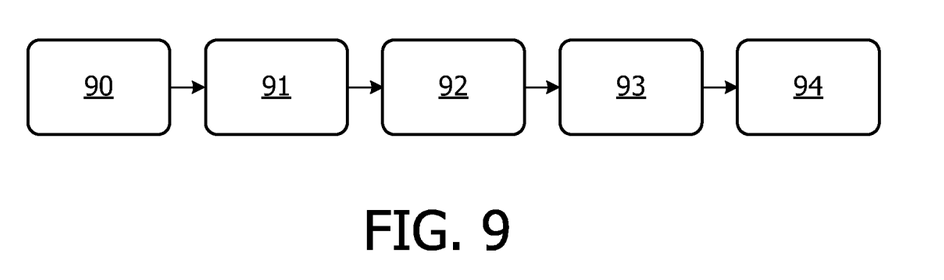
FIG. 9 is a flow chart showing steps in the method of visualizing one or more sets of voxel data.

FIG. 9 is a flow chart showing steps in the method of visualizing one or more sets of voxel data. One or more sets of voxel data are provided 90. Subsequently, a segment model is provided 91 and the voxel data is segmented. The segmented voxel data is reformatted 92 to fit a reference shape. The reformatted voxel data is next mapped 93 to a target shape. Finally, the target shape is visualized 94. Some of the steps may be performed automatically, whereas other steps may be performed in connection with user input.

Embodiment: Implementation of the Volumetric Bull's Eye Plot

Figure 10:
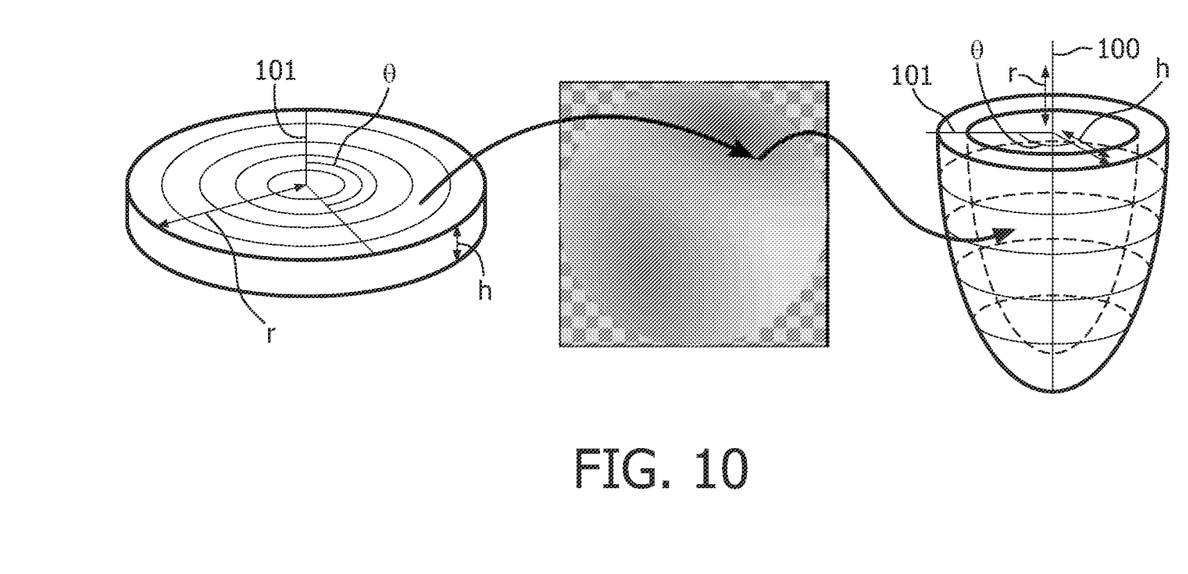
FIG. 10 illustrates an embodiment of the parameterization applied in connection with constructing the VBEP.

The VBEP may be seen as an unfolding of the left ventricle along the long axis followed by a reformatting into a cylinder. The unfolding is based on a parametrization of both the cylinder and the left ventricular myocardium. The parameterization of the cylinder is illustrated in FIG. 10. The long 100 and the short 101 axes of the reference shape may be extracted from a geometric heart model, which may be used to represent the voxel data of the whole heart scan. However, these axes may also be extracted by other means. For example, the axes can be extracted from the orientation information of the late enhancement scan. The endocardium and the epicardium are segmented as a pair of contours on each slice of the late enhancement scan. Each contour is represented by a uniformly sampled piecewise cubic Bèzier spline. In this context, uniformly sampled is to be understood as that the length of any segment of a spline s between s(t) and s(t') is proportional to $\|t-t'\|$.

The parameterization used for the unfolding or mapping may be based on cylindrical coordinates. FIG. 10 illustrates the parametrization of the cylinder and the left ventricles in the cylindrical coordinates (r, θ, h). Each point $\vec{x}_{cyl}=(x, y, z)$ in the Cartesian space of the cylinder, which represents the unfolded myocardium, is transformed into its parameterized form $\vec{x}_p=(r, \theta, h)$. Since the parameterized form is directly translatable to the parameterized myocardium, $\vec{x}_p$ is then transformed back into the Cartesian space of the myocardium.

In the parameterized form r represents the distance from the center of the cylinder. In the myocardium it represents the distance to the apex along the long axis. The apex of is typically not included in a short-axis late enhancement scan. A non-zero value of r may be assigned to the contours on the slice closest to the apex. A value of 10% of the radius of the cylinder has proved to work in practise. As each contour is orthogonal to the long axis, each point on a contour, or even a whole late enhancement slice, shares the same value of r, implying that equidistant slices are mapped to equidistant cylinders.

The variable θ defines the angle from the zero-axis. In the cylinder the zero-axis corresponds to the positive y-axis; in the myocardium it corresponds to the short axis. Since an angle can not be used directly to index a contour, the angle is linearly transformed to a value within the range [0, 1], on which the splines representing the contours are defined.

To gain control over the distortions this introduces due to the local fluctuations in the length of the contours each contour is resampled as follows. On each slice, a spokewheel is placed that divides both the epicardial and endocardial contours in a number of segments. Typically 12 segments are used. The first spoke defines the zero angle and is aligned with the short axis. The splines are resampled defining the contours, such that for t=i/n with n being the number of spokes and i∈[0,n], s(t) is on spoke number i. Within each spoke segment, that is for t∈[i/n, (i+1)/n] with i∈[0,n], the spline is uniform.

The variable h defines the height within the cylinder. A height of 0 corresponds to the bottom of the cylinder and the epicardial surface in the myocardium. A height of 1 corresponds to the top of the cylinder and the endocardial surface in the myocardium. Linearity between the epicardial and the endocardial layers is assumed to be conserved during the unfolding. In other words, a line parallel to the z-axis in the cylinder is still a straight line in the myocardium, connecting the epicardium and the endocardium.

In order to render the VBEP, a mechanism that transforms a point $\vec{x}_{cyl}$ inside the cylinder to a point $\vec{x}_{myo}$ inside the myocardium is required. Due to performance reasons the transformations are not performed explicitly. Instead, a pair of transformation maps is used, to translate $\vec{x}_{cyl}$ into a tuple ($\vec{x}_{epi}, \vec{x}_{endo}$, h). Due to the assumption of linearity between the epicardial and the endocardial layers, it follows that $$\vec{x}_{myo}=(1-h)\cdot\vec{x}_{epi}+h\cdot\vec{x}_{endo}$$

A transformation map $T_\alpha$ is a 2D look-up table that can be used to transform a point $\vec{x}_{cyl}$ on the plane h=α inside the cylinder into a point $\vec{x}_{myo}$ for a particular value of h. Since for each point inside the cylinder it holds that z=h, the transformation map can be constructed such that x and y can directly be used as indexing variables.

Two transformation maps $T_0$ and $T_1$ are constructed, the maps correspond to the epicardial and endocardial surfaces respectively. For each transformation map the value of h is fixed. All possible values of r and θ are iterated. From each tuple (r, θ, h) both $\vec{x}_{cyl}$ and $\vec{x}_{myo}$ are computed. The computation of $\vec{x}_{cyl}$ is straightforward using cylindrical coordinates: $\vec{x}_{cyl}=(r\cdot\sin(\theta), r\cdot\cos(\theta), h)$. The computation of $\vec{x}_{myo}$ is more complicated. The variable h, which is either 0 or 1, is used to determine whether the epicardial or the endocardial contours should be used. Given that there are m slices with contours defined on them, i=(m−1)r is defined. The point $\vec{x}_{myo}$ is now located between the contours i and i+1. The exact location is determined by interpolation these two contours. By constructing a Bèzier surface from all contours, r would simply be one of the indexing variables. The variable θ is used to index the (interpolated) contours as explained earlier.

Once both $\vec{x}_{cyl}$ and $\vec{x}_{myo}$ are available the value of $\vec{x}_{myo}$ is stored in the transformation map at the location of $\vec{x}_{cyl}$. Only the x and y components of $\vec{x}_{cyl}$ are used as index variables. The transformation maps are implemented using OpenGL's 2D texture mapping functionality by storing the x, y and z coordinates of $\vec{x}_{myo}$ into the r, g and b values of the textures, respectively. In order to acquire sufficient precision, the GL_RGB16F_ARB texture format which uses 16-bit floating point numbers for each channel is used. Since OpenGL offers only support for rectangular textures and the transformation maps are only defined for a circle, the alpha channel is used to indicate whether the index variable are within the domain of the transformation map. With the two transformation maps computed as described above, any point $\vec{x}_{cyl}$ inside the cylinder can be translated into points $\vec{x}_{epi}$ and $\vec{x}_{endo}$ by indexing the epicardial and endocardial transformation maps respectively using the x and y components of $\vec{x}_{cyl}$. Using the fact that z=h it follows that:

$$\vec{x}_{myo} = (1-h) \cdot \vec{x}_{epi} + h \cdot \vec{x}_{endo}$$

By means of these two transformation maps the volume of the VBEP is thus implicitly defined, no second volume is constructed.

The wall thickness may be preserved by using the transformation maps during the rendering phase. Given a point $\vec{x}_{cyl}$ in the cylinder, the corresponding point in the myocardium is reconstructed using a linear combination of $\vec{x}_{epi}$ and $\vec{x}_{endo}$. The wall thickness may be defined as the Euclidean distance between $\vec{x}_{epi}$ and $\vec{x}_{endo}$.

The wall thickness information is used to alter the implicitly defined volume to express the varying wall thickness in various degrees. This may be implemented by scaling h before computing the linear combination of the coordinates from the two transformation maps. Without scaling, all wall thickness information is ignored. Scaling with $$\left( \frac{h}{w_{max}} \cdot (1-v) + v \right)^{-1}$$

where $w_{max}$ denotes the maximum wall thickness and v the degree of wall thickness visibility, allows to vary between visualizing absolute wall thickness (v=0) and no wall thickness information (v=1) continuously.

Unfolding to a rectangle instead of a cylinder, may be implemented in a similar way, where the parameterization of the left ventricle is mapped to a cuboid. The cuboid may be parameterized by mapping r, θ and h to the x-, y- and z-axes respectively. Due to the shape of the cuboid, the transformation maps can be stored more efficiently in the 2D textures. The preservation of the wall thickness may be accomplished in a similar way as with the cylinder.

The invention can be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method of visualizing one or more sets of voxel data, the set of voxel data representing a three dimensional (3D) image of at least a part of a mammal body, the method comprising:
   providing one or more sets of voxel data comprising spatial information for each voxel point, and, for each voxel point, a corresponding set of voxel values;
   providing a segment model of the part of the mammal body, and segmenting the voxel data in accordance with this segment model;
   reformatting the segmented voxel data to fit a reference shape, the reference shape being defined by at least an inner reference surface and an outer reference surface;
   mapping the reformatted voxel data to a target shape, the target shape being defined by at least a first target surface and a second target surface;
   visualizing the target shape;
   wherein the mapping of the reformatted voxel data to a target shape is a mapping of one or more property values from the inner reference surface to the first target surface, and from the outer reference surface to the second target surface, the one or more property values being based on at least one voxel value from the one or more sets of voxel values, and wherein a direction extending along the inter-surface distance of the reference shape is maintained in the target shape.

2. The method according to claim 1, wherein distinct values in the reference shape are mapped to distinct values in the target shape.

3. The method according to claim 1, wherein one or more reference structures are identified in the one or more sets of voxel data, and wherein the one or more reference structures are mapped onto the target shape so as to visualize the target shape with the one or more reference structures overlaid.

4. The method according to claim 1, wherein a 3D spatial rendering of the set of voxel data is provided and visualized in combination with a visualization of the target shape.

5. The method according to claim 4, wherein a region is selectable on the 3D spatial rendering or on a rendering of the target shape, and wherein by selecting a region on one of the 3D spatial rendering or on a rendering of the target shape, the corresponding region is marked on the other of the 3D spatial rendering or on rendering of the target shape.

6. The method according to claim 1, wherein the one or more property values represent one or more values related to one or more medical parameters of the part of the mammal body.

7. The method according to claim 1, wherein the reference shape represents a reformatted geometry of the part of the mammal body.

8. The method according to claim 1, wherein the target shape has a circular, elliptic or polygonal cross-section along a symmetry direction.

9. The method according to claim 1, wherein the part of the mammal body is an organ, and wherein the outer reference surface and the inner reference surface define a region of interest for the organ.

10. The method according to claim 9, wherein distance between the outer reference surface and the inner reference surface define a thickness of the region of interest for the organ.

11. The method according to claim 9, wherein the direction extending along the inter-surface distance of the target shape represents thickness of the region of interest for the organ.

12. The method according to claim 11, wherein the thickness along the inter-surface distance of the target shape is either scaled to the distance between the outer reference surface and the inner reference or to an anatomical thickness of the region of interest for the organ.

13. The method according to claim 1, wherein the mapping between the reformatted voxel data of the reference shape and the target shape is based on a first transformation map between the inner reference surface and the first target surface, and a second transformation map between the outer reference surface and the second target surface.

14. The method according to claim 1, wherein the set of voxel data is provided from a technique selected from: magnetic resonance imaging (MRI), computed tomography (CT), positron electron tomography (PET), single photon emission computed tomography (SPECT), ultrasound scanning, and rotational angiography.

15. A non-transitory computer-readable medium carrying software instructions which, when implemented on a computer, cause the computer to perform the steps of claim 1.

16. A visualization system for visualizing one or more sets of voxel data, the set of voxel data representing a three dimensional (3D) image of at least a part of a mammal body, the system comprising:
  input unit for receiving one or more sets of voxel data comprising spatial information for each voxel point, and, for each voxel point, a corresponding set of voxel values;
  segmenting unit for providing a segment model of the part of the mammal body, and segmenting the voxel data in accordance with this segment model;
  reformatting unit for reformatting the segmented voxel data to fit a reference shape, the reference shape being defined by at least an inner reference surface and an outer reference surface;
  mapping unit for mapping the reformatted voxel data to a target shape, the target shape being defined by at least a first target surface and a second target surface;
  visualizing unit for visualizing the target shape;
  wherein the mapping of the reformatted voxel data to a target shape is a mapping of one or more property values from the inner reference surface to the first target surface, and from the outer reference surface to the second target surface, the one or more property values being based on at least one voxel value from the one or more sets of voxel values, and wherein a direction extending along the inter-surface distance of the reference shape is maintained in the target shape.

17. The medical examination apparatus according to claim 16, further comprising an acquisition unit for acquiring medical image data in the form of one or more sets of voxel data.

18. A visualization system for visualizing a set of voxel data, the set of voxel data representing a three-dimensional image of at least a part of a mammal body and including spatial information and a data value for each voxel, the system comprising:
  one or more processors programmed to:
    receive the set of voxel data,
    segment the set of voxel data in accordance with a segmentation model,
    reformat the segmented set of voxel data to fit a reference shape defined by an inner reference surface and an outer reference surface,
    map the reformatted, segmented set of voxel data to a target shape defined by a first target surface and a second target surface, the mapping including mapping property values based on the voxel values of the set of voxel data from the inner reference surface to the first target surface and from the outer reference surface to the second target surface such that distance in a reference shape direction between the inner and outer reference surfaces of the reference shape is maintained in and mapped to a target shape direction in the target shape, and
    control a display device to visualize the target shape.

* * * * *